United States Patent [19]

Kim et al.

[11] Patent Number: 5,561,471

[45] Date of Patent: Oct. 1, 1996

[54] APPARATUS AND METHOD FOR CONTROLLING THE DISPLAY OF A CAPTION ON A SCREEN AND FOR MAXIMIZING THE AREA DEVOTED TO PRESENTATION OF THE RECEIVED VIDEO SIGNAL

[75] Inventors: Seong S. Kim, Seoul, Rep. of Korea

[73] Assignee: Goldstar Co., Ltd., Seoul, Rep. of Korea

[21] Appl. No.: 330,854

[22] Filed: Oct. 27, 1994

Related U.S. Application Data

[63] Continuation of Ser. No. 132,962, Oct. 7, 1993, abandoned.

[30] Foreign Application Priority Data

Oct. 12, 1992 [KR] Rep. of Korea ............... 18743/1992
Feb. 13, 1993 [KR] Rep. of Korea ................ 1983/1993
Aug. 17, 1993 [KR] Rep. of Korea ............... 15888/1993

[51] Int. Cl.⁶ .......................... H04N 7/087; H04N 5/45; H04N 7/08
[52] U.S. Cl. .......................... 348/565; 348/553; 348/478
[58] Field of Search .................. 348/563–570, 348/553, 554, 580, 584, 588, 589, 594, 596, 600, 598, 468, 465, 461, 476, 478, 725, 734; 345/118, 119; H04N 5/45, 5/445, 7/08, 7/278, 7/087, 7/088

[56] References Cited

U.S. PATENT DOCUMENTS

| | | | |
|---|---|---|---|
| 3,891,792 | 6/1975 | Kimura | 358/147 |
| 4,675,737 | 6/1987 | Fujino et al. | 358/183 |
| 5,091,785 | 2/1992 | Canfield et al. | 358/183 |
| 5,138,450 | 8/1992 | Fukuda et al. | 358/147 |
| 5,298,995 | 3/1994 | Monta et al. | 348/589 X |
| 5,357,286 | 10/1994 | Hwang | 348/589 |
| 5,376,970 | 12/1994 | Amano | 348/569 |

FOREIGN PATENT DOCUMENTS 63-169186  7/1988  Japan .............. H04N 5/45

Primary Examiner—Safet Metjahic

[57] ABSTRACT

An apparatus and a method for controlling the display of a caption on the screen of a monitor such as a television. The apparatus comprises a remote controller for generating a caption move select mode signal corresponding to a caption move select key thereon, a remote control signal receiver for receiving the caption move select mode signal from the remote controller, a microprocessor for outputting a control signal to perform a mode corresponding to the caption move select mode signal received by the remote control signal receiver, a caption processing circuit responsive to the control signal from the microprocessor for extracting a caption signal from a video signal, decoding the extracted caption signal, changing the preselected position information of control code of the decoded caption signal in response to changed position information of the caption move select mode signal from the remote controller and outputting the changed position information together with character code of the decoded caption signal, the changed position information of the caption move select mode signal being determined according to the number of times that the caption move select key on the remote controller is pushed by the user, and a monitor for displaying the character code from the caption processing circuit as a caption on a screen thereof in accordance with the changed position information from the caption processing circuit.

14 Claims, 10 Drawing Sheets

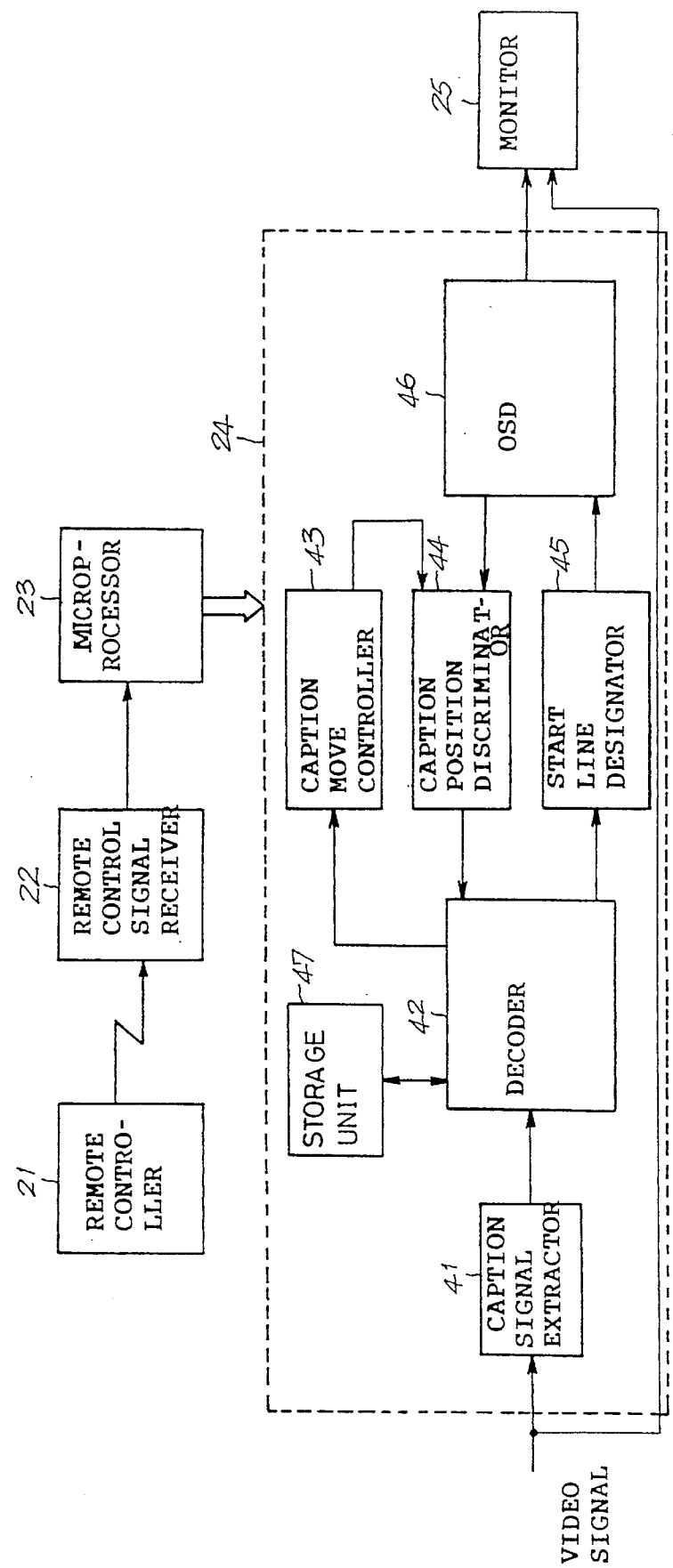

1

APPARATUS AND METHOD FOR CONTROLLING THE DISPLAY OF A CAPTION ON A SCREEN AND FOR MAXIMIZING THE AREA DEVOTED TO PRESENTATION OF THE RECEIVED VIDEO SIGNAL

This application is a continuation of application Ser. No. 08/132,962, filed on Oct. 7, 1993, now abandoned.

BACKGROUND OF THE INVENTION

1. Field of the Invention

The present invention relates in general to the control of the display of a caption in video signal processing systems, and more particularly to an apparatus and a method for controlling the display of a caption, in which the position in which a caption is to be displayed can be moved freely on a screen, a visible range of a video signal on a screen can be maximized and caption position information set by the user can be stored.

2. Description of the Prior Art

In conventional video signal processing systems, a caption process is performed by decoding character code data placed on the 21st line of an odd field of a video signal and displaying the decoded data on a particular position of a screen of a monitor of a television or a video cassette recorder (VCR). In the case Where a video tape made in one country is to be distributed in the other country, the rows of speech on the video tape in the language of one country may be translated into that of the other country and the translated rows are then dubbed onto the video tape to be displayed as a caption on the screen of the monitor, for the purpose of facilitating a viewer's understanding. For example, the rows of a video tape made in English may be caption-processed in Hangul.

In the conventional video tape, the rows of which are directly dubbed in Hangul as mentioned above, the viewer cannot select the position of the display of the dubbed caption at his option. This form of caption is commonly referred to as a so-called "open" caption.

On the other hand, the original English rows encoded on the 21st line of the odd field of the video signal can be decoded and then displayed as a caption on the screen of the monitor according to a viewer's selection. This form of caption is commonly referred to as a so-called "closed" caption. In this case, the caption process is performed by displaying the rows encoded on the 21st line of the odd field of the video signal in a specified position of the screen. Generally, the caption is displayed within the range of 4 rows on the screen which is divided into 15 equal rows.

Referring to FIG. 1, there is shown a block diagram of a conventional apparatus for controlling the caption display. As shown in this drawing, the conventional caption display control apparatus comprises a remote controller 1 for generating a plurality of mode signals to perform modes corresponding to various keys in a video signal processing system and remotely transmitting the generated mode signals, a remote control signal receiver 2 for receiving the mode signals transmitted remotely from the remote controller 1, and a microprocessor 3 for outputting a plurality of control signals to perform the modes corresponding to the mode signals received by the remote control signal receiver 2.

A caption processing circuit 4 is operated under the control of the microprocessor 3 to extract a caption signal from a video signal, decode the extracted caption signal and display character codes of the decoded caption signal as a caption at a position on a screen which is indicated by control codes of the decoded caption signal.

A monitor 5 is provided in the conventional caption display control apparatus to display the caption from the caption processing circuit 4 on the screen thereof.

The caption processing circuit 4 includes a caption signal extractor 11 for extracting the caption signal from the video signal. Here, the caption signal is placed on a particular row of the video signal.

The caption processing circuit 4 also includes a decoder 12 for decoding the extracted caption signal from the caption signal extractor 11 to extract the control codes and the character codes from the caption signal. The control code contains preselected position information, attribute information and indent information necessary to the display of the caption. The preselected position information indicates the position of the caption to be displayed and the attribute information indicates a form of the caption to be displayed. The character code is actually displayed as the caption.

Also, the caption processing circuit 4 includes an on-screen display unit 13 for displaying the character code from the decoder 12 as the caption on the screen of the monitor 5 in accordance with the control code from the decoder 12.

The operation of the conventional caption display control apparatus with the above-mentioned construction will hereinafter be described with reference to FIGS. 1 to 3E.

First, when a caption select key on the remote controller 1 is pushed by the user, the remote controller 1 outputs remotely a mode signal corresponding to the pushed caption select key to the remote control signal receiver 2. As a result, the remote control signal receiver 2 receives the corresponding mode signal from the remote controller 1.

The mode signal received by the remote control signal receiver 2 is applied to the microprocessor 3. In response to the mode signal from the remote control signal receiver 2, the microprocessor 3 outputs a control signal corresponding to the received mode signal to perform the corresponding mode of operation. The control signal from the microprocessor 3 is applied to the caption processing circuit 4.

In the caption processing circuit 4, the caption signal extractor 11 extracts the caption signal placed on a 21st line of an odd field of the video signal in response to the control signal from the microprocessor 3. The caption signal extracted by the caption signal extractor 11 is decoded by the decoder 12 for extraction of the control code and the character code from the caption signal. As mentioned above, the control code contains the preselected position information, the attribute information and the indent information necessary to the display of the caption. The preselected position information indicates the position of the caption to be displayed and the attribute information indicates the form of the caption to be displayed. The character code is actually displayed as the caption. Also, the decoder 12 outputs a control signal such that the character code is displayed in accordance with the control code. The control signal from the decoder 12 is applied to the on-screen display unit 13.

In response to the control signal from the decoder 12, the on-screen display unit 13 processes the character code to be displayed on the screen of the monitor 5. The processed character code is displayed on the screen of the monitor 5 as shown in FIG. 2A.

Generally, the caption is displayed within the 12th to 15th rows, L12–L15, of the 15 rows, L1–L15, of the screen, as shown in FIG. 2A or within first to fourth rows, L1–L4, thereof as shown in FIG. 2B. For example, in the case where the rows of the character code to be displayed are two in number, the caption is displayed in the 14th and 15th rows, L14 and L15, rather than the 12th and 13th rows, L12 and L13, as shown in FIG. 2A or in the first and second rows L1 and L2, rather than the third and fourth rows, L3 and L4, as shown in FIG. 2B. In this case, the caption is displayed in a white or blue color in a background which is boxed in a black or blue color. The remainder of the screen is processed such that the original video signal can be viewed.

However, when the caption is displayed in the 12th to 15th rows, L12–L15, of the screen as shown in FIG. 2A, it is displayed by superimposing it over the dubbed caption in the viewer's native language as stated previously, resulting in a difficulty in discrimination between the two captions.

On the other hand, when a caption move select key on the remote controller 1 is pushed by the user to freely select a position of the caption to be displayed, the remote controller 1 outputs remotely a mode signal corresponding to the pushed caption move select key to the remote control signal receiver 2. As a result, the remote control signal receiver 2 receives the corresponding mode signal from the remote controller 1.

The mode signal received by the remote control signal receiver 2 is applied to the microprocessor 3. In response to the mode signal from the remote control signal receiver 2, the microprocessor 3 outputs a control signal corresponding to the received mode signal to perform the corresponding mode. The control signal from the microprocessor 3 is applied to the caption processing circuit 4. In response to the control signal from the microprocessor 3, the caption processing circuit 4 moves the position of the caption being presently displayed on the screen as shown in FIGS. 3A to 3E.

FIG. 3A illustrates a state in which the video signal is usually displayed on the screen, FIG. 3B illustrates a state in which only the caption is boxed on the screen, FIG. 3C illustrates a state in which the whole of the rows in which the caption is displayed is boxed on the screen, FIG. 3D illustrates a state in which the caption in FIG. 3C is expanded on the screen, and FIG. 3E illustrates a state in which the caption is displayed on the whole of the screen.

With the caption move select key pushed, the caption displayed in the 12th to 15th rows of the screen is moved to the first to fourth rows thereof. In this case, if the caption is a sentence of two rows, it is displayed in the third and fourth rows of the screen, whereas the first and second rows remain empty. The empty space results in a reduction in the visible range of the video signal on the screen. Also, information regarding the moved position of the caption cannot be stored. For this reason, the position of the caption to be displayed must be set whenever the video signal processing system such as the television or the VCR is operated.

SUMMARY OF THE INVENTION

Therefore, the present invention has been made in view of the above problems, and it is an object of the present invention to provide an apparatus and a method for controlling caption display, in which position of a caption to be displayed can be moved freely on a screen according to a user's selection.

It is another object of the present invention to provide an apparatus and a method for controlling caption display, in which a visible range of a video signal can be maximized.

It is yet another object of the present invention to provide an apparatus and a method for controlling caption display, in which information regarding a changed position of a caption can be stored so that the caption can be displayed at the position previously displayed.

In accordance with one aspect of the present invention, there is provided an apparatus for controlling caption display, comprising a remote control means for generating a caption move select mode signal corresponding to the activation of a caption move select key thereon and remotely transmitting the generated caption move select mode signal; remote control signal reception means for receiving the caption move select mode signal transmitted remotely from said remote control means; control means for outputting a control signal to perform a mode corresponding to the caption move select mode signal received by said remote control signal reception means; caption processing means responsive to the control signal from said control means for extracting a caption signal being placed on a particular line of a video signal, decoding the extracted caption signal, changing position information of control data of the decoded caption signal in response to changed position information of the caption move select mode signal from said remote control means and outputting the changed position information together with character code of the decoded caption signal, the changed position information of the caption move select mode signal being determined according to the number of times that the caption move select key on said remote control means is pushed by the use; and display means for displaying the character code from said caption processing means as a caption on a screen thereof in accordance with the changed position information from said caption processing means.

In accordance with another aspect of the present invention, there is provided a method of controlling caption display, comprising the steps of (a) decoding a caption signal extracted from a video signal to extract preselected position information from the caption signal and then discriminating whether a caption move select key is pushed by the user, the extracted preselected position information indicating a position of a caption to be displayed on a screen; (b) changing the preselected position information extracted at said step (a) according to the number of times that said caption move select key is pushed by the user, if it is discriminated at said step (a) that said caption move select key is pushed by the user, and then informing the user that the caption is moved to a position of the screen corresponding to the changed position information; and (c) displaying the caption at the position on the screen corresponding to the position information changed at said step (b).

BRIEF DESCRIPTION OF THE DRAWINGS

The above and other objects, features and advantages of the present invention will be more clearly understood from the following detailed description taken in conjunction with the accompanying drawings, in which:

FIG. 4 is a block diagram of an apparatus for controlling the caption display in accordance with the present invention;

DETAILED DESCRIPTION OF THE PREFERRED EMBODIMENT

Figure 1:
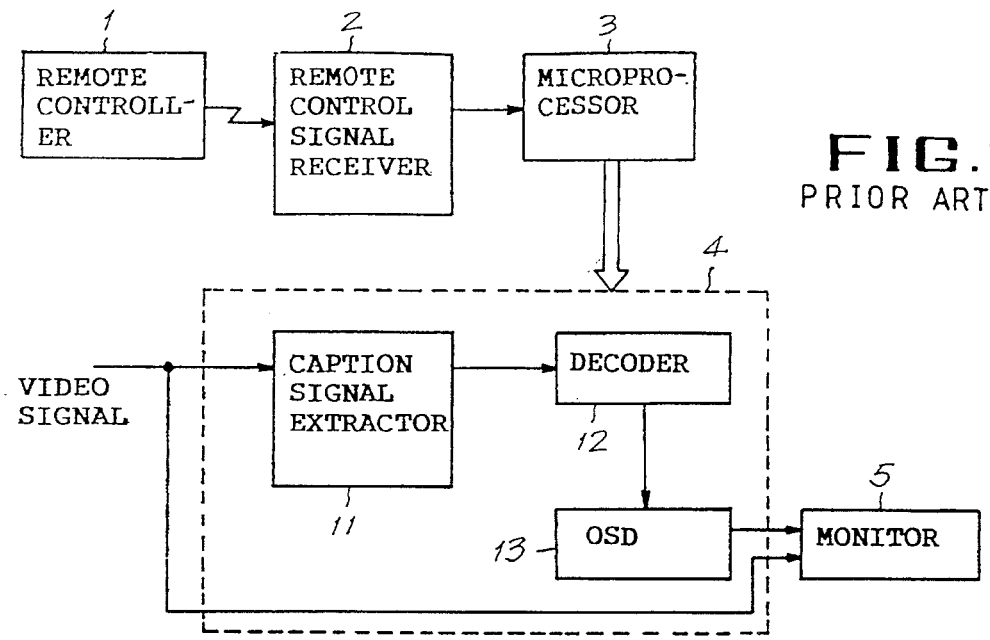
FIG. 1 is a block diagram of a conventional apparatus for controlling caption display.
Figure 2A:
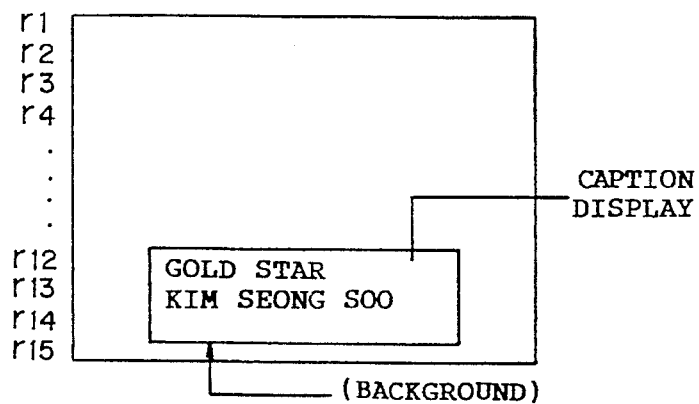
FIGS. 2A and 2B are views illustrating states in which a caption may be displayed on a screen of a monitor when a caption select key in the apparatus in FIG. 1 is pushed by the user.
Figure 2B:
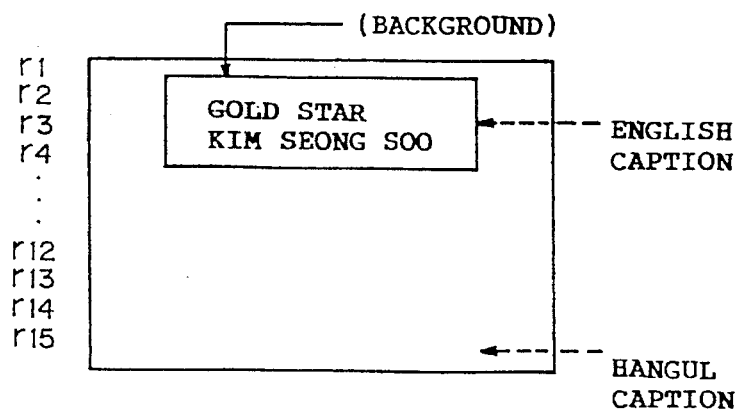
Figure 3A:
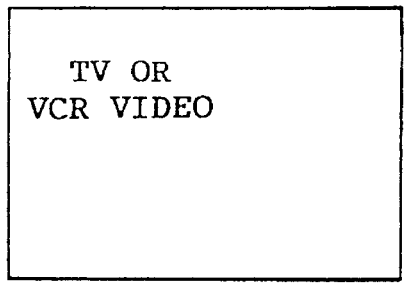
FIGS. 3A to 3E are views illustrating states in which the caption may be displayed on the screen of the monitor when a caption move select key in the apparatus in FIG. 1 is pushed by the user.
Figure 3B:
Figure 3C:
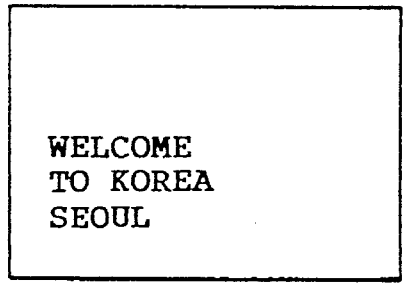
Figure 3D:
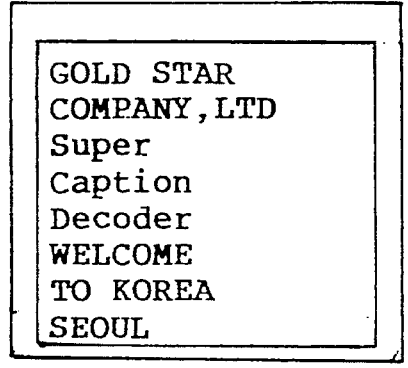
Figure 3E:
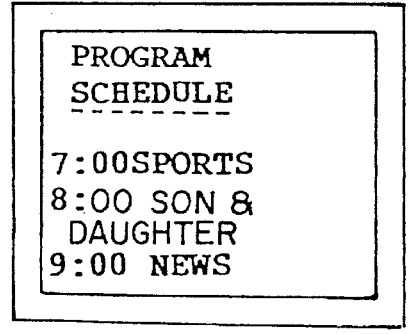

Referring to FIG. 4, there is shown a block diagram of an apparatus for controlling the display of a caption in accordance with the present invention. As shown in this drawing, the caption display control apparatus of the present invention comprises a remote controller 21 for generating a plurality of mode signals to perform modes corresponding to various keys in a video signal processing system and remotely transmitting the generated mode signals, a remote control signal receiver 22 for receiving the mode signals transmitted remotely from the remote controller 21, and a microprocessor 23 for outputting a plurality of control signals to perform the modes corresponding to the mode signals received by the remote control signal receiver 22.

A caption processing circuit 24 is operated under the control of the microprocessor 23 to extract a caption signal being placed on a particular line of a video signal, decode the extracted caption signal, change the caption position information of control data of the decoded caption signal in response to changed position information of a caption move select mode signal from the remote controller 21 and output the changed position information together with the character code of the decoded caption signal. The changed position information of the caption move select mode signal from the remote controller 21 is determined according to the number of times that a caption move select key on the remote controller 21 is pushed by the user.

A monitor 25 is also provided as in the conventional caption display control apparatus to display the character code from the caption processing circuit 24 as a caption on a screen thereof in accordance with the position information from the caption processing circuit 24.

The caption processing circuit 24 includes a caption signal extractor 41 for extracting the caption signal from the video signal, a decoder 42 for decoding the extracted caption signal from the caption signal extractor 41 to extract the control code and the character code from the caption signal. The control code contains the preselected position information, attribute information and indent information necessary to the display of the caption. The preselected position information indicates a preset position of the caption to be displayed and the attribute information indicates a form of the caption to be displayed. The character code is actually displayed as the caption. The decoder 42 is also adapted to change the preselected position information of the extracted control code into the changed position information of the caption move select mode signal from the remote controller 21 and output the changed position information together with the character code.

A caption move controller 43 is provided in the caption processing circuit 24 to count the number of times that the caption move select key on the remote controller 21 is pushed by the user and to output the changed position information of the caption move select mode signal in accordance with the counted result.

A caption position discriminator 44 is also provided in the caption processing circuit 24 to detect the changed position information from the caption move controller 43 and the number of rows of the character code being presently displayed on the screen and to output the detected results to the decoder 42.

The decoder 42 further changes the changed position information according to the detected line number from the caption position discriminator 44. As a result, the caption being presently displayed is moved in accordance with the changed position information from the caption position discriminator 44 and is further moved according to the detected row number from the caption position discriminator 44 so that a visible range of the video signal can be maximized.

A start line designator 45 is also provided in the caption processing circuit 24 to designate a start row of the caption to be displayed on the screen in response to the changed position information from the decoder 42 and to output the resultant control signal such that the display of the caption can be started in the designated start row.

Also, the caption processing circuit 24 includes an on-screen display unit 46 for processing the character code in response to the control signal from the start row designator 45 to be displayed as the caption on the screen of the monitor 25, and a storage unit 47 for storing the changed position information from the decoder 42.

The operation of the caption display control apparatus with the above-mentioned construction in accordance with the present invention will hereinafter be described in detail with reference to FIGS. 4 to 9.

Figure 5:
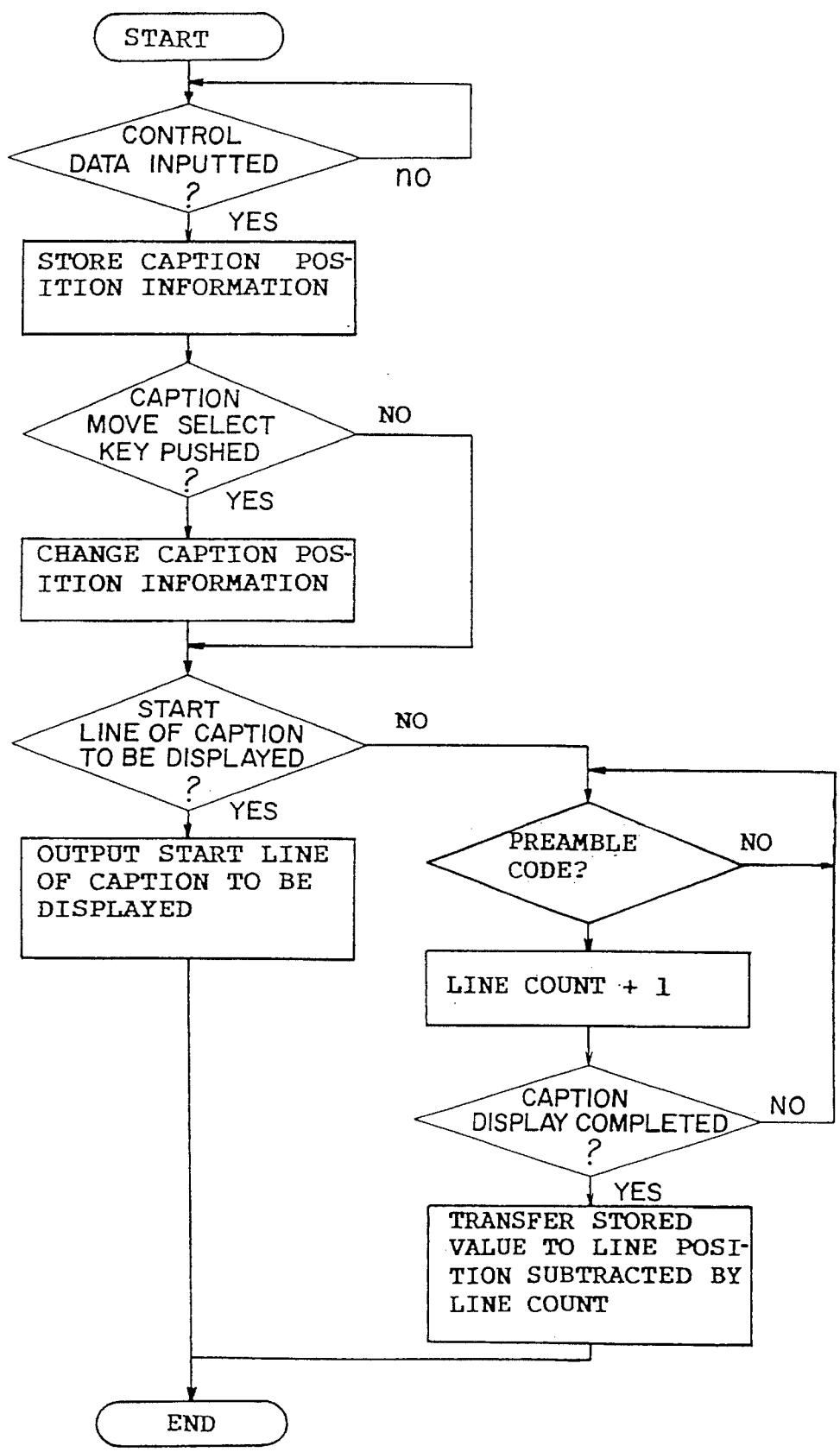
FIG. 5 is a flowchart illustrating a method of controlling the caption display in accordance with a first embodiment of the present invention.
Figure 6A:
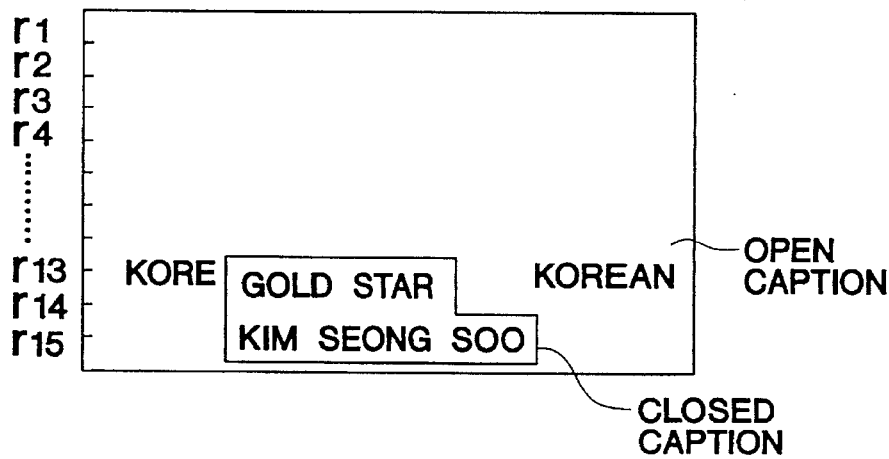
FIGS. 6A to 6F are views illustrating states in which the caption may be displayed on the screen of the monitor in accordance with the method in FIG. 5.
Figure 6B:
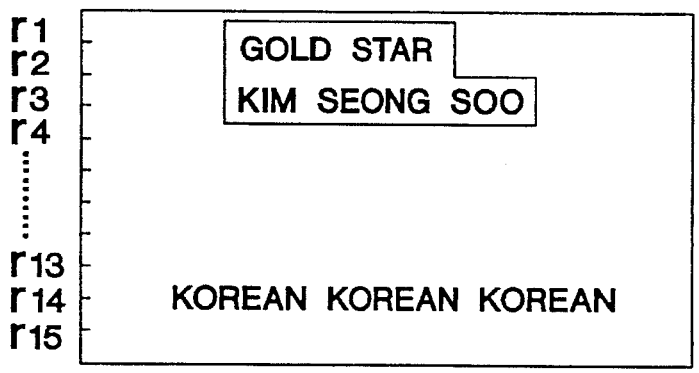
Figure 6C:
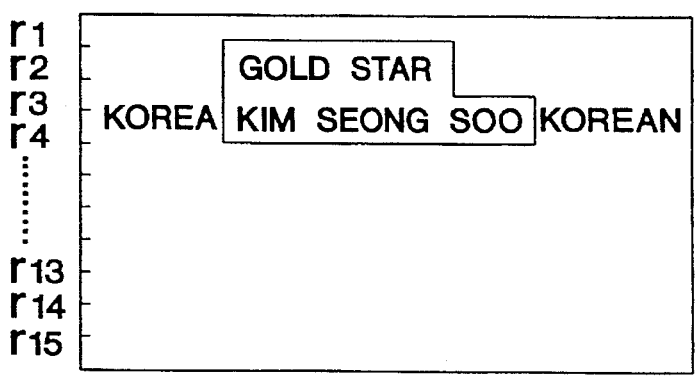
Figure 6D:
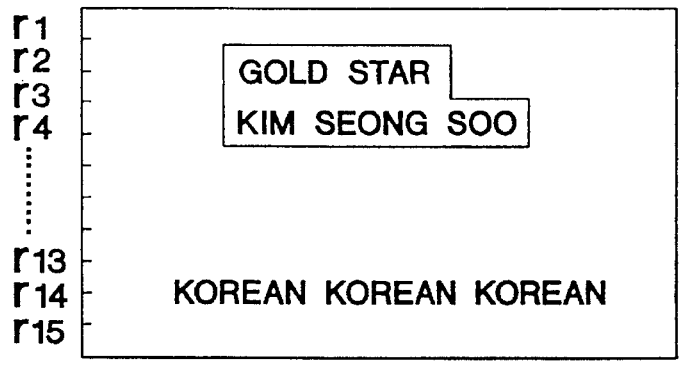
Figure 6E:
Figure 6F:

With reference to FIGS. 5 to 6F, there will first be described an operation of the invention in which one of the captions of a foreign language and a user's native language when both of the captions are simultaneously displayed on the screen.

FIG. 5 is a flowchart illustrating a method of controlling the caption display in accordance with a first embodiment of the present invention and FIGS. 6A to 6F are views illustrating states in which the caption may be displayed on the screen of the monitor in accordance with the method set forth in FIG. 5. When the caption move select key on the remote controller 21 is pushed by the user, the remote controller 21 outputs remotely a mode signal corresponding to the pushed caption move select key to the remote control signal receiver 22. As a result, the remote control signal receiver 22 receives the corresponding mode signal from the remote controller 21.

The mode signal received by the remote control signal receiver 22 is applied to the microprocessor 23. In response to the mode signal from the remote control signal receiver 22, the microprocessor 23 outputs a control signal corresponding to the received mode signal to perform the corresponding mode. The control signal from the microprocessor 23 is applied to the caption processing circuit 24.

In the caption processing circuit 24, in response to the control signal from the microprocessor 23, the caption move controller 43 counts the number of times that the caption move select key on the remote controller 21 is pushed by the user and outputs the resulting changed position information for the caption move select mode signal in accordance with the counted result to the caption position discriminator 44.

The caption position discriminator 44 detects row information regarding the number of rows of the character code being presently displayed on the screen and outputs the detected row information together with the changed position information from the caption move controller 43 to the decoder 42. The detection of the row information is performed by detecting a preamble code that is placed on the character code of the caption signal to indicate a start point of a row of the character code to be displayed.

Also, the caption signal extractor 41 extracts the caption signal which is placed on the 21st row of the odd field of the video signal in response to the control signal from the microprocessor 23 and outputs the extracted caption signal to the decoder 42.

The caption signal extracted by the caption signal extractor 41 is decoded by the decoder 42 for extraction of the control code and the character code from the caption signal. As mentioned above, the control code contains the preselected position information, the attribute information and the indent information necessary for the display of the caption. The position information indicates the preselected position of the caption to be displayed and the attribute information indicates the form of the caption to be displayed. The character code is that which is actually displayed on the monitor 25 as the caption. Also, the decoder 42 changes the preselected position information of the extracted control data in response to the changed position information from the caption position discriminator 44. The decoder 42 further changes the changed position information according to the detected row information from the caption position discriminator 44. Namely, the caption being presently displayed on the monitor 25 is moved according to the changed position information from the caption position discriminator 44 and further moved according to the detected row information from the caption position discriminator 44, so that the visible range of the video signal can be displayed on the monitor 25 to its maximum. As a result, the position of the caption to be displayed is determined and accomplished.

The changed position information from the decoder 42 is applied to the start row designator 45 for conversion into information regarding the start row of the caption to be displayed on the screen of the monitor 25. As a result of the conversion, the start line designator 45 outputs the control signal such that the display of the caption can be started in the designated start row. The control signal from the start line designator 45 is applied to the on-screen display unit 46.

In response to the control signal from the start row designator 45, the on-screen display unit 46 processes the character code of the caption signal to be displayed as the caption on the screen of the monitor 25. As a result, the processed character code from the on-screen display unit 46 is outputted on the screen of the monitor 25.

The changed position information from the decoder 42 is stored in the storage unit 47. For example, in the case of again moving the caption that had been moved previously, the position information for the caption to be moved is determined on the basis of the previously changed position information stored in the storage unit 47 and the row information from the caption position discriminator 44.

To put it more concretely, assume that the screen is divided into 15 equal rows, in 4 rows of which the caption is displayed, as shown in FIGS. 6A to 6F, and an up key of the caption move select key on the remote controller 21 is pushed 11 times by the user.

In this case, the caption move controller 43 counts the 11 times that the up key of the caption move select key is pushed by the user and outputs the counted value 11, as the changed position information of the caption that is to be moved upwardly to the caption position discriminator 44.

The caption position discriminator 44 detects the preselected position information regarding the 12th to 15th rows of the screen and the row information regarding two rows of the character code as shown in FIG. 6A and outputs the detected preselected position information and two-row information together with the counted value 11 from the caption move controller 43 to the decoder 42.

Also, the caption signal extractor 41 extracts the caption signal placed on the 21st line of the odd field of the video signal and outputs the extracted caption signal to the decoder 42. From the extracted caption signal from the caption signal extractor 41, the decoder 42 obtains the preselected position information of the caption being presently displayed on the monitor 25. The obtained preselected position information usually indicates the 12th to 15th rows of the screen as shown in FIG. 6A.

The preselected position information of the 12th to 15th rows is moved by 11 rows to the first to fourth rows as shown in FIG. 6D. In this case, since no character code to be displayed is present in the first and second rows of the screen, the changed position information is further moved upwardly by an additional 2 rows according to the two-row information as shown in FIG. 6B. As a result, the caption is actually displayed in the first and second rows of the screen. If a character code is present in the 12th row, there is no margin so that further movement is not made, but in case that any further margin exists, the position information is further moved to extend the visible region for user's convenience.

In response to the changed position information from the decoder 42, the start row designator 45 designates the start row in which the caption is to be displayed and outputs the resultant control signal such that the display of the caption can be started in the designated start row. The control signal from the start row designator 45 is applied to the on-screen display unit 46.

The on-screen display unit 46 processes the character code of the caption signal in response to the control signal from the start row designator 45. As a result, the processed character code from the on-screen display unit 46 is displayed as the caption on the screen of the monitor 25 as shown in FIG. 6B.

Assuming that, as another example of an upward movement, the up key of the caption move select key is pushed 9 times by the user, the 12th to 15th rows of the screen in which the caption is displayed as shown in FIG. 6A are moved to correspond to the third to sixth rows of the screen, respectively. In this case, since no character data to be displayed is present in the fifth and sixth rows of the screen, the position information is further moved upwardly by an additional 2 rows according to the two-row information. As a result, the caption is actually displayed in the third and fourth rows of the screen, as shown in FIG. 6D.

In other words, if the position information of the moved caption corresponds to the first to eighth rows of the screen, the caption as shown in FIG. 6A is controlled such that a character is displayed on a screen from the first row of the moved caption, as shown in FIG. 6D. Accordingly, an empty space in the caption display area is removed on the screen so that the visible range of the video signal is maximized. On the other hand, as an example of a down key input, the caption as shown in FIG. 6C is moved downwardly to the screen by one row and displayed whenever the down key of the caption move select key is pushed by a user. If the position information of the moved caption corresponds to the ninth to fifteenth rows of the screen as shown in Fig. e, the display thereof is actually competed in the last row of the position information as shown in FIG. 6F. Accordingly, an empty space in the caption display area is removed on the screen so that the visible range of the video signal is maximized.

As mentioned above, according to the present invention, the position of the caption to be displayed can be moved on the screen freely according to the user's selection. Therefore, the foreign language caption and the caption in the user's native language can be displayed simultaneously on the screen without superimposition on each other, thereby allowing the user to view both of the captions on the screen simultaneously. Also, the changed position of the caption is further moved according to the number of rows of character code that are presently being displayed on the screen. This has the effect of maximizing the visible range of the video signal.

Figure 7:
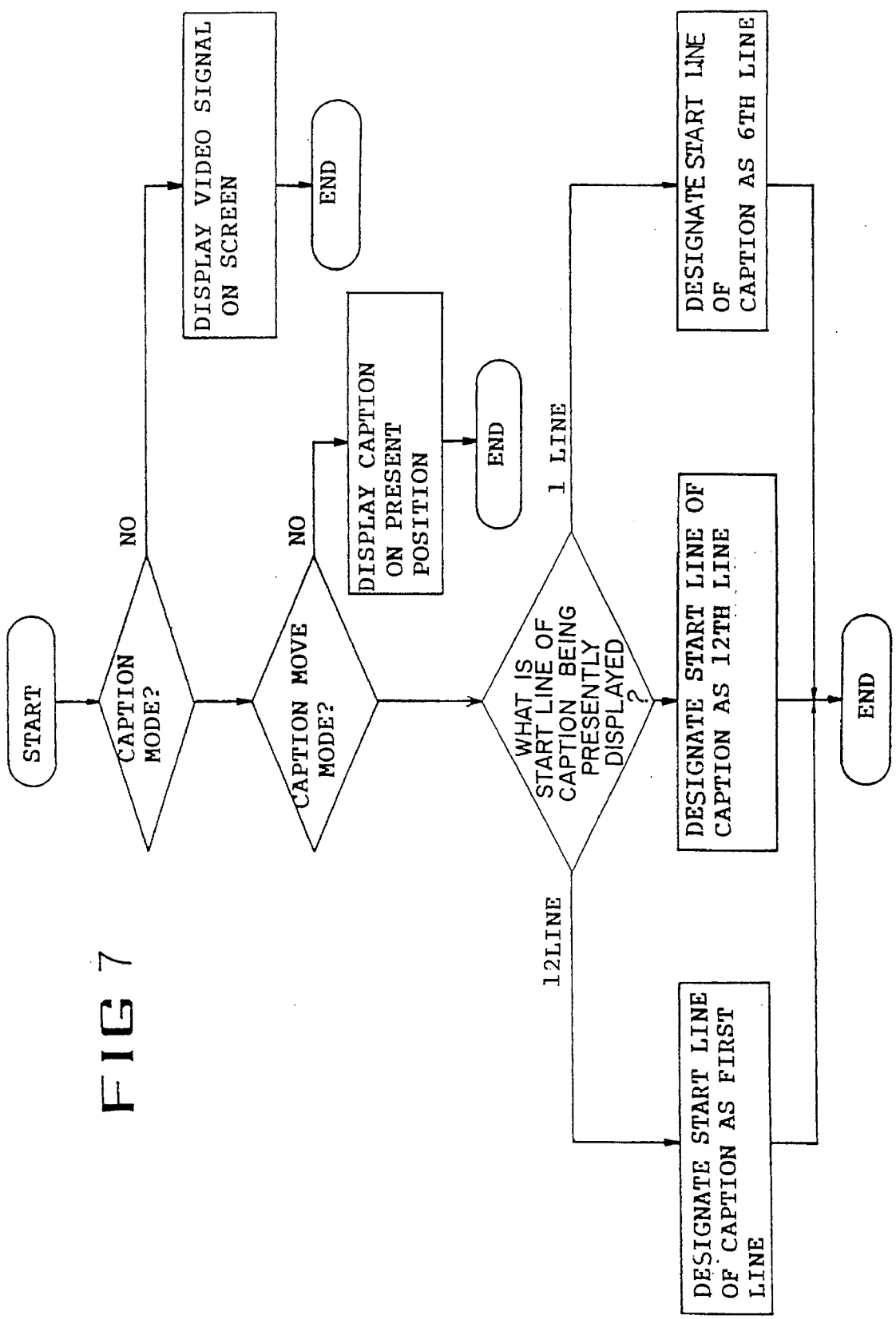
FIG. 7 is a flowchart illustrating a method of controlling the caption display in accordance with a second embodiment of the present invention.

Referring to FIG. 7, there is shown a flowchart illustrating a method of controlling the caption display in accordance with a second embodiment of the present invention. In this embodiment, the caption move controller 43 in FIG. 4 is adapted to start the caption display in the first row of the screen when the up key of the caption move select key on the remote controller 21 is pushed by the user and to start the caption display in the twelfth row of the screen when the down key of the caption move select key is pushed by the user.

Under this condition, when the caption move select key on the remote controller 21 is pushed by the user, the remote controller 21 outputs remotely the mode signal corresponding to the depressed caption move select key to the remote control signal receiver 22. As a result, the remote control signal receiver 22 receives the corresponding mode signal from the remote controller 21.

The mode signal received by the remote control signal receiver 22 is applied to the microprocessor 23. In response to the mode signal from the remote control signal receiver 22, the microprocessor 23 outputs a control signal corresponding to the received mode signal to perform the corresponding mode. The control signal from the microprocessor 23 is applied to the caption processing circuit 24.

In the caption processing circuit 24, in response to the control signal from the microprocessor 23, the caption move controller 43 outputs the position information preset therein. For example, if the up key of the caption move select key is pushed by the user to move the caption being displayed in the twelfth row of the screen, the caption move controller 43 outputs the preset position information regarding the sixth row. The output preset position information from the caption move controller 43 is applied to the decoder 42. Also, the row information from the caption position discriminator 44 is applied to the decoder 42. The row information from the caption position discriminator 44 indicates the number of rows of the character code being presently displayed on the screen.

On the other hand, the caption signal extractor 41 extracts the caption signal placed on the 21st line of the odd field of the video signal in response to the control signal from the microprocessor 23 and outputs the extracted caption signal to the decoder 42.

The caption signal extracted by the caption signal extractor 41 is decoded by the decoder 42 for extraction of the control code and the character code from the caption signal. As mentioned above, the control code contains the preselected position information, the attribute information and the indent information necessary to the display of the caption. The preselected position information indicates the position of the caption to be displayed and the attribute information indicates the form of the caption to be displayed. The character code is actually displayed as the caption.

Also, the decoder 42 changes the preselected position information of the extracted control code in response to the preset position information from the caption position discriminator 44. The decoder 42 further changes the converted position information according to the detected row information from the caption position discriminator 44. Namely, the caption being presently displayed is moved in accordance with the converted position information from the caption position discriminator 44 and further moved in accordance with the detected row information from the caption position discriminator 44. As a result, the changed position of the caption to be displayed is determined.

The changed position information from the decoder 42 is applied to the start row designator 45 for conversion into the information regarding the start line of the caption to be displayed on the screen. As a result of the conversion, the start row designator 45 outputs a control signal such that the display of the caption can be started in the designated start row. The control signal from the start row designator 45 is applied to the on-screen display unit 46. In response to the control signal from the start row designator 45, the on-screen display unit 46 processes the character code of the caption signal to be displayed as the caption on the screen of the monitor 25. As a result, the processed character code from the on-screen display unit 46 is displayed on the screen of the monitor 25.

Figure 8A:
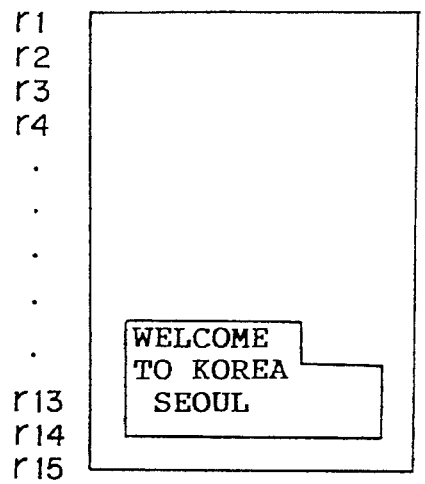
FIGS. 8A to 8D are views illustrating states in which the caption may be displayed on the screen of the monitor in accordance with the method in FIG. 7.
Figure 8B:
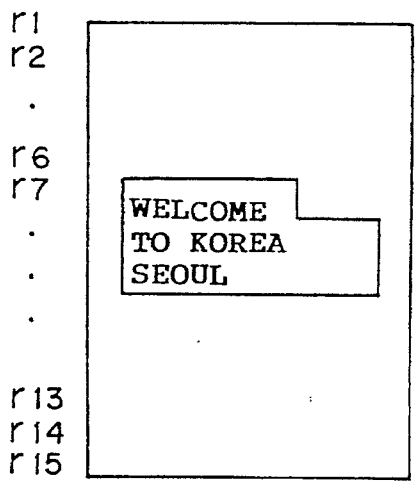

To put it more concretely, if the up key of the caption move select key is pushed by the user to move the caption being displayed in the twelfth to fifteenth rows of the screen as shown in FIGS. 8A upwardly, the caption move controller 43 outputs the preset position move information regarding the sixth to ninth rows, in response to the key input from the user. In accordance with the preset output position information from the caption move controller 43, the caption as shown in FIG. 8A is displayed in the sixth to ninth rows of the screen as shown in FIG. 8B.

Figure 8C:
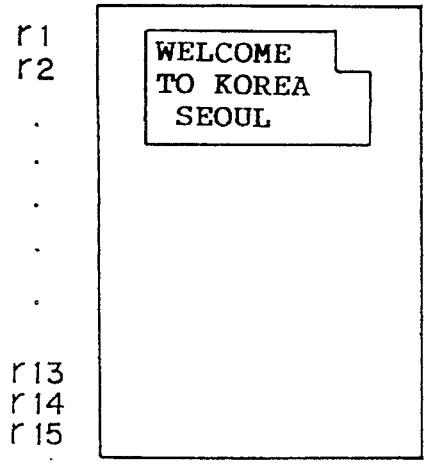

The moved position information is stored in the storage unit 47. The prior position information stored in the storage unit 47 is replaced by the position information preset in the caption move controller 43 when the up key of the caption move select key is again pushed by the user. Namely, the caption displayed in the sixth to ninth rows of the screen as shown in FIG. 8B is moved to the first to fourth rows of the screen, as shown in FIG. 8C.

On the other hand, if the down key of the caption move select key is pushed by the user, the position information regarding the sixth to ninth rows is outputted from the storage unit 47 and then converted into the changed position information regarding the twelfth to fifteenth rows. As a result, the caption displayed in the sixth to ninth rows of the screen as shown in FIG. 8B is moved to the twelfth to fifteenth rows of the screen, as shown in FIG. 8A.

In other words, the caption is moved upwardly cyclically by three steps on the screen whenever the up key of the caption move select key is pushed by the user. Also, the caption is moved downwardly cyclically by three steps on the screen whenever the down key of the caption move select key is pushed by the user.

Figure 8D:

FIG. 8D illustrates a state in which the caption is displayed on the whole of the screen.

Figure 9:
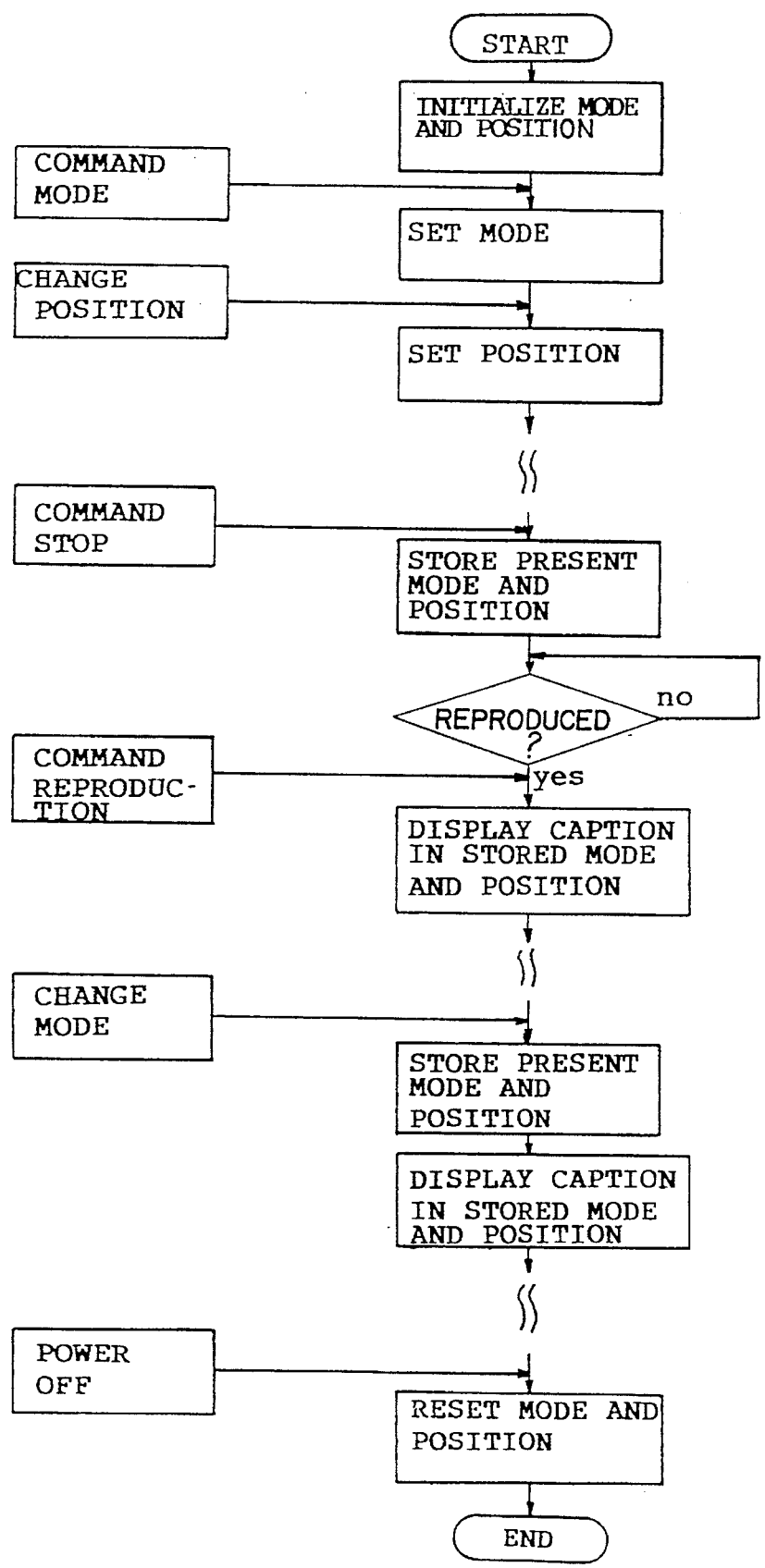
FIG. 9 is a flowchart illustrating a method of controlling the caption display in accordance with a third embodiment of the present invention.

Referring to FIG. 9, there is shown a flowchart illustrating a method of controlling the caption display in accordance with a third embodiment of the present invention. Upon powering the video signal processing system, the prior position information stored in the storage unit 47 is initialized. If the user pushes the caption move select key on the remote controller 21 while viewing the video signal on the screen, the caption being presently displayed is changed in position on the screen. The changed position information is then stored in the storage unit 47.

In the case where the user turns off the video signal processing system or pushes a different key on the remote controller 21 while viewing the caption together with the video signal, the corresponding mode is performed. Thereafter, when the user operates the remote controller 21 to view the previously viewed video signal and caption, the caption is displayed on the screen in accordance with the position information in the storage unit 47 corresponding to the previously displayed position of the caption.

Namely, in the video signal processing system such as, for example, the television, if the user changes the existing channel while viewing the caption together with the video signal and then reselects the corresponding channel again, the caption is displayed in the previous position on the screen. Therefore, there is no necessity for setting the position of the caption to be displayed on the screen in everything.

As is apparent from the above description, according to the present invention, the position of the caption to be displayed can be moved freely on the screen according to the user's selection. Therefore, the foreign language caption and the user's native language caption can be displayed simultaneously on the screen with no superimposition on each other, thereby allowing the user to view both of the captions on the screen simultaneously. Also, the moved position of the caption is further moved according to the number of rows of the character code being presently displayed on the screen. This has the effect of maximizing the visible range of the video signal. Moreover, there is no necessity for setting the position of the caption to be displayed on the screen in everything, resulting in a convenient use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling the display of a caption, comprising:

remote control means for generating a caption move select mode signal corresponding to a caption move select key thereon and remotely transmitting the generated caption move select mode signal;

remote control signal reception means for receiving the caption move select mode signal transmitted remotely from the remote control means;

control means for outputting a control signal to perform a selected caption move mode corresponding to the caption move select mode signal received by the remote control signal reception means;

caption processing means responsive to the control signal from the control means for:

extracting a caption signal being placed on a particular line of a video signal, decoding the extracted caption signal to acquire preselected position information and character code for the caption signal, detecting the number of rows of character code being presented for display, changing the preselected position information of the decoded caption signal in response to (i) the move position information of the caption move select mode signal from the remote control means, the move position information of the caption move select mode signal being determined by the number of times that the caption move select key on the remote control means is pushed by a user, and (ii) the detected number of rows of character code being presented for display so that a visible range of the video signal can be maximized, while simultaneously watching both an open caption and a closed caption, and outputting the changed position information together with the character code of the decoded caption signal; and display means for displaying the character code as a caption on a screen thereof in a position thereon selected in accordance with the changed position information whereby the caption is displayed on the screen in a position selected by the user and so as to maximize the screen area devoted to presentation of the video signal.

2. An apparatus for controlling the display of a caption, comprising:

first control means for generating a caption move select mode signal corresponding to a selected mode of move for the caption in the display;

second control means for outputting a control signal to perform the selected mode of move for the caption in the display in response to the caption move select mode signal;

a caption signal extractor for extracting a caption signal from a particular line of a received video signal;

a decoder for decoding the extracted caption signal from the caption signal extractor to extract control code and character code from the caption signal, the control code containing preselected position information, attribute information, and indent information necessary to the display of the caption, the preselected position information indicating a preselected position of the caption in the display, the attribute information indicating a form of the caption to be displayed, and the character data being that which is actually to be displayed as the caption;

a caption move controller responsive to the control signal from the second control means for detecting the selected mode of move for the caption in the display and outputting move position information in accordance with the selected mode;

a caption position discriminator for detecting the move position information from the caption move controller and the number of rows of character code being presented for display and outputting the detected results to the decoder;

the decoder changing the preselected position information of the extracted control code in response to the detected results from the caption position discriminator, and outputting the changed position information together with the character code so that a visible range of the video signal can be maximized;

a start row designator for designating a start row of the caption to be displayed in response to the changed position information from the decoder and outputting the resultant control signal such that the display of the caption can be started on the designated start row;

an on-screen display unit for processing the character code in response to the control signal from the start row designator to be displayed; and display means for displaying the character code as a caption on a screen thereof in a position thereon selected in accordance with the changed position information from the decoder whereby the caption is displayed on the screen in a position selected by a user and so as to maximize the screen area devoted to presentation of the video signal.

3. An apparatus for controlling the display of a caption as set forth in claim 2, wherein the first control means comprises:

a remote control means for generating the caption move select mode signal in response to the depression of a caption move select key thereon and remotely transmitting the generated caption move select mode signal; and a remote control signal reception means for receiving the caption move select mode signal transmitted remotely from the remote control means.

4. An apparatus for controlling the display of a caption as set forth in claim 3, wherein the caption move controller counts the number of times that the caption move select key on the remote control means is depressed by the user and outputs the move position information in accordance with the counted result.

5. An apparatus for controlling the display of a caption as set forth in claim 2, wherein the apparatus further comprises:

storage means for storing the changed position information from the decoder.

6. An apparatus for controlling the display of a caption as set forth in claim 3, wherein the caption move controller outputs the move position information to move the caption upwardly/downwardly by one row on the screen whenever the caption move select key on the remote control means is pushed by the user.

7. An apparatus for controlling the display of a caption as set forth in claim 3, wherein the caption move controller outputs the move position information to move the caption directly to a predetermined position on the screen whenever the caption move select key on the remote control means is pushed by the user.

8. An apparatus for controlling the display of a caption as set forth in claim 2, wherein the decoder changes the preselected position information according to the move position information from the caption move controller and further changes the changed position information according to the detected number of rows from the caption position discriminator to move the caption being presently displayed to a position such that the visible range of the video signal can be maximized.

9. A method for controlling the display of a caption, comprising the steps of:

(a) detecting a command to move the position of the display of a caption on a screen;

(b) discriminating whether a user has entered a command to move the position of the display on the screen;

(c) extracting a caption signal being placed on a particular line of a video signal;

(d) decoding the extracted caption signal to acquire preselected position information and character code for the caption signal, the extracted preselected position information indicating a preselected position for a caption to be displayed on a screen;

(e) detecting the number of rows of character code being presented for display;

(f) changing the preselected position information of the decoded caption signal in response to (i) the command to move the position of the display of a caption on a screen, and (ii) the detected number of rows of character code being presented for display so that a visible range of the video signal can be maximized while simultaneously watching both an open caption and a closed caption;

(g) outputting, the changed position information together with the character code of the decoded caption signal; and (h) displaying the character code as a caption on the screen thereof in a position thereon selected in accordance with the changed position information whereby the caption is displayed on the screen in a position selected by the user and so as to maximize the screen area devoted to presentation of the video signal.

10. A method for controlling the display of a caption as set forth in claim 9, wherein step (f) includes the substeps of:

setting a predetermined position for the caption to be displayed on the screen; and displaying the caption at the predetermined set position on the screen at the election of the user.

11. A method for controlling the display of a caption as set forth in claim 10, wherein step (f) includes the further substep of:

moving the caption cyclically to the predetermined set position of the screen at the election of the user.

12. A method for controlling the display of a caption as set forth in claim 9, wherein step (f) includes the substep of:

designating a changed start row for the character code of the caption to be displayed, as a corresponding start row of the screen within the screen boundary.

13. A method for controlling the display of a caption as set forth in claim 9, wherein step (f) includes the substep of:

designating an changed end row for the character code of the caption to be displayed, as a corresponding end row of the screen within the screen area.

14. A method for controlling the display of a caption as set forth in claim 9, wherein step (f) includes the substep of:

storing the changed position information.

* * * * *